US011249211B2

(12) United States Patent
Felkl et al.

(10) Patent No.: US 11,249,211 B2
(45) Date of Patent: Feb. 15, 2022

(54) SAND PACK AND GRAVEL PACK ACOUSTIC EVALUATION METHOD AND SYSTEM

(71) Applicant: Seismos Inc., Austin, TX (US)

(72) Inventors: Jakub Felkl, Austin, TX (US); Richard Coates, Austin, TX (US); Junwei Zhang, Austin, TX (US); Panagiotis Adamopoulos, Lakeway, TX (US); Kaitlyn C. Mascher-Mace, Aurora, CO (US)

(73) Assignee: Seismos Inc., Austin, TX (US)

( * ) Notice: Subject to any disclaimer, the term of this patent is extended or adjusted under 35 U.S.C. 154(b) by 37 days.

(21) Appl. No.: 16/569,961

(22) Filed: Sep. 13, 2019

(65) Prior Publication Data

US 2020/0072997 A1 Mar. 5, 2020

Related U.S. Application Data

(63) Continuation-in-part of application No. PCT/US2018/028045, filed on Apr. 18, 2018.

(60) Provisional application No. 62/487,722, filed on Apr. 20, 2017.

(51) Int. Cl.
*G01V 1/30* (2006.01)
*E21B 49/00* (2006.01)
*G01V 1/46* (2006.01)
*G01V 1/50* (2006.01)

(52) U.S. Cl.
CPC ............ *G01V 1/306* (2013.01); *E21B 49/008* (2013.01); *G01V 1/46* (2013.01); *G01V 1/50* (2013.01); *G01V 2210/6248* (2013.01); *G01V 2210/63* (2013.01); *G01V 2210/67* (2013.01)

(58) Field of Classification Search
CPC . G01V 1/306; G01V 1/46; G01V 1/50; G01V 2210/6248; G01V 2210/63; G01V 2210/67; E21B 49/008
See application file for complete search history.

(56) References Cited

U.S. PATENT DOCUMENTS

| 7,330,790 | B2 | 2/2008 | Berg | |
|---|---|---|---|---|
| 8,635,907 | B2 * | 1/2014 | Bakulin | ................ E21B 47/107 73/152.05 |
| 8,706,419 | B1 * | 4/2014 | Taylor | ...................... G01V 1/50 702/11 |

(Continued)

OTHER PUBLICATIONS

Teexas Instruments, TI-Nspire™ CX CAS "Time Derivatives" 2008—https://education.ti.com/~/media/6130DF5D764A422E8939510506CA4E93 (Year: 2008).*

(Continued)

*Primary Examiner* — Regis J Betsch
(74) *Attorney, Agent, or Firm* — Richard A. Fagin

(57) ABSTRACT

A method for characterizing a sand-pack or gravel-pack in a subsurface formation includes inducing a pressure change to induce tube waves in fluid in a well drilled through the subsurface formation. At a location proximate to a wellhead at least one of pressure and a time derivative of pressure in the well is measured for a selected length of time. At least one of a physical parameter and a change in the physical parameter with respect to time, of the sand-pack or gravel-pack, is determined using the measured pressure and/or the time derivative of pressure.

38 Claims, 6 Drawing Sheets

(56) References Cited

U.S. PATENT DOCUMENTS

| | | |
|---|---|---|
| 2004/0173351 A1 | 9/2004 | Fox et al. |
| 2005/0168349 A1 | 8/2005 | Huang et al. |
| 2005/0183858 A1 | 8/2005 | Ayoub et al. |
| 2006/0293857 A1* | 12/2006 | Moos ............... G01V 1/005 702/12 |
| 2008/0306692 A1 | 12/2008 | Singer et al. |
| 2013/0079935 A1 | 3/2013 | Kabannik et al. |
| 2014/0369165 A1 | 12/2014 | Sinha |
| 2015/0103624 A1 | 4/2015 | Thompson et al. |

OTHER PUBLICATIONS

Kenji Furui, Thesis: "A Comprehensive Skin Factor Model for Well Completions Based On Finite Element Simulations", The University of Texas at Austin May 2004 (Year: 2004).*
International Search Report and Written Opinion, International Application No. PCT/US2018/028045 dated Jul. 19, 2018.

* cited by examiner

SAND PACK AND GRAVEL PACK ACOUSTIC EVALUATION METHOD AND SYSTEM

CROSS REFERENCE TO RELATED APPLICATIONS

Continuation of International Application No. PCT/US2018/028045 filed on Apr. 18, 2018. Priority is claimed from U.S. Provisional Application No. 62/487,722 filed on Apr. 20, 2017. Both the foregoing applications are incorporated herein by reference in their entirety.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

The present disclosure relates generally to the field of drilling and completing oil and gas wells. More specifically it relates to creating and characterizing a sand-pack or gravel-pack, such as that shown in FIG. 1. These terms (sand or gravel pack) refer to the insertion of a volume of sand or gravel inside the bottom section of a wellbore, or in a volume surrounding a perforated section of a cased wellbore, as shown in FIGS. 2A and 2B to mitigate the problem of fine particulate material from within the formation being drawn into the wellbore by the flow of oil, gas, water or a mixture thereof during subsequent production from the wellbore and hydrocarbon reservoir.

Unconsolidated reservoir formations with high permeability are most susceptible to sand production, which may start during first flow or later when reservoir pressure has fallen or water breaks through. Sand production commences with varying degrees of severity, not all of which require action. The rate of sand production may decline with time at constant production conditions and is frequently associated with cleanup after stimulation of the reservoir formation.

Sometimes, even continuous sand production may be tolerated, but this option may lead to a well becoming seriously damaged, production being reduced or stopped or surface equipment being damaged or made inoperative. What constitutes an acceptable level of sand production depends on operational constraints such as resistance to erosion, separator capacity, ease of sand disposal and the capability of artificial lift equipment to remove sand-laden fluid from the well.

Well known techniques for completing sand-production susceptible reservoirs physically restrain sand movement. The four main classes of completion are resin injection, slotted liners and prepacked screens, resin-coated gravel without screens and gravel packing.

Resin injection is used to cement the sand grains in situ. A resin is injected into the formation, generally through perforations, and is then flushed with a catalyst. The resin binds rock particles together creating a stable matrix of permeable, consolidated grains around the wellbore casing. Clay concentration can hinder the effectiveness of the consolidation process, so a clay stabilizer is often used as a preflush. Complete coverage of larger zones is difficult unless selective placement tools are used. Although resin consolidation is used successfully, it accounts for no more than about 10% of sand-control completions.

Slotted pipes, screens and prepacked screens offer the lowest-cost for sand production control in the form of filtering of producible sand. Slotted liners have the largest holes, wire-wrapped screens have smaller openings, while screens prepacked with resin-coated sand offer the finest filtering. Each type can be run as part of the completion string and are particularly suited for high-angle wells, which cannot be easily completed otherwise. Slots are typically sized to cause bridging of the largest 10% of the formation particles, filling the annulus between the screen and casing, or open hole, with formation sand creating a filter for remaining particles. Slotted liners and prepacked screens are used in only about 5% of sand control options.

Resin-coated gravel may be used as a downhole filter without installing a screen. The gravel is circulated into position as a slurry, either inside casing or open hole and then squeezed to form a plug across the production zone. Adjacent particles are bonded together by the resin, strengthening the pack. In wells having casing already in place, the plug may be completely drilled out to leave gravel-filled perforations. The pack may also be drilled out to the top of the perforations in open hole so that hydrocarbons are produced through the pack. A narrow hole can be drilled through the pack to provide a conduit to reduce drawdown through the pack. The pack creates significant additional flow resistance that may affect productivity. If the drillout technique is employed to reduce flow resistance, all perforations must be evenly packed and the resulting pack may be fragile. The technique represents about 5% of sand-control treatments, mainly concentrated on low-cost onshore wells.

Gravel packing has been used by the oil industry since the 1930s. Today, it is the most widely used sand control measure, accounting for about three-quarters of well completion sand control techniques. A slurry of selected sized gravel in a carrier fluid is pumped into the annular space between a centralized screen and either perforated casing or open (uncased) wellbore. The gravel also enters perforations if a cased-hole gravel pack is being performed. As pumping continues, carrier fluid leaks off into the formation or through the screen and back to surface. The gravel pack creates a granular filter with very high permeability (about 120 Darcies) but prevents formation sand entering the well.

Gravel packs have certain drawbacks. During installation, carrier fluid is injected into the formation which may damage the reservoir permeability and restrict production. The pack then tends to trap the damage in the perforations, preventing clean up. Once in place, the pack in perforation tunnels increases drawdown which may seriously affect productivity.

For a gravel pack to maintain long-term productivity, the gravel must be clean, tightly packed and placed with the minimum damage to the formation. These requirements depend on the correct selection of gravel, carrier fluid and placement technique. They also rely on scrupulous cleanliness during placement operations to prevent the contamination of the gravel pack by small particles that significantly reduce pack permeability.

Minimizing the pressure drop in the perforation tunnels is important to successful gravel packing and this requires gravel that is as large as possible. But since the pack must act as an effective filter, the gravel also has to be small enough to restrain formation particles. This depends on the size of the formation sand, which is usually measured using sieve analysis.

With the gravel pack in place, there are two elements to be evaluated: that gravel has been packed everywhere it was intended to go, and that the well is producing hydrocarbons satisfactorily. Since voids in the pack may lead to early completion failure, post-pack evaluation is important to detect incomplete fill and allow repairs to be undertaken. Prior to placement, gravel may be coated with radioactive isotopes and the pack assessed using gamma ray logging. However, the coating is usually inconsistent and may wash off, making quantitative analysis unreliable.

One way to improve the accuracy of such radioactivity gravel pack logs is to use particles that have been manufactured with isotope encapsulated within each particle's resistant shell. This also offers increased subtlety through use of multiple isotopes. The perforations may be prepacked using particles containing, e.g., scandium followed by particles containing iridium. Packing placement efficiency can be monitored, using a gamma spectroscopy tracer log.

Alternatively, the effectiveness of fill or packing may be gauged using nuclear density logging to estimate the density of material in the annulus. However, not all changes in density are related to changes in gravel-pack quality. For example, changes in the screen, pipe base, casing, tubing and formation sand all affect the density measurement. A base log run prior to the gravel packing can clarify any such ambiguities in the density log. In addition, a reference screen may be set below a sump packer to register zero pack response.

Density measurement is not appropriate when the completion fluid has a high density (more than 14 lbs/gal) or where low-density packing particles have been used. In these cases, neutron activation logging can be used. The neutron activation logging technique uses a pulsed-neutron logging tool modified to allow a gamma ray device to be mounted below it. The pack is bombarded with fast neutrons. Silicon and aluminum in the gravel are activated and gamma rays are emitted as the elements return to their natural stable state. The number of gamma rays is proportional to the amount of silicon and aluminum activated, and pack quality may be inferred.

In uncased wellbore (open-hole) packs, a compensated neutron log can be used to detect hydrogen-rich fluids in the gravel-pack pore space, making it sensitive to changes in pack porosity. The compensated neutron tool near and far detectors are used to reduce the effects of hole conditions on the measurements made. The curves of the two detectors are scaled to overlay in areas of low porosity, wherein is indicated a good pack.

Another technique for testing gravel packs centers on assessing performance using well tests and production logging. In assessing gravel pack performance a number of diagnostics are available, including skin factor (which measures formation damage as a function of its permeability) and multi-rate flow tests. Many of such evaluation methods require the deployment of costly and rig-time consuming wireline methods at least once and often twice or more. They may also have limited depth of analysis beyond the immediate wellbore. It is clearly desirable to develop a method that can provide reliable characterization of the sand/gravel pack without these costly and limited downhole measurements.

SUMMARY

A method for characterizing a sand-pack or gravel-pack in a subsurface formation according to one aspect includes inducing a pressure change in a wellbore drilled through the subsurface formation so as to induce tube waves in the wellbore. Pressure and/or time derivative thereof is measured at a location proximate to a wellhead for a selected length of time. A physical parameter and and/or change in the physical parameter with respect to time is determined of the sand-pack or gravel-pack, using the measured at least one of pressure and the time derivative of pressure.

In some embodiments, the inducing a pressure change comprises pumping a sand-pack or gravel-pack treatment.

In some embodiments, the inducing a pressure change comprises water hammer generated by changing a flow rate of fluid into or out of the well.

In some embodiments, the inducing a pressure change comprises operating an acoustic source which injects a pressure pulse into fluid within the well.

In some embodiments, the pressure change generates Stoneley waves in the wellbore.

In some embodiments, the at least one of a physical parameter, and a change in the physical parameter with respect to time is determined before the pumping the sand-pack or gravel-pack treatment.

In some embodiments, the at least one of a physical parameter, and a change in the physical parameter with respect to time is determined during the pumping of the sand-pack or gravel-pack treatment.

In some embodiments, the at least one of a physical parameter, and a change in the physical parameter with respect to time is determined after the pumping the sand-pack or gravel-pack treatment.

In some embodiments, the physical parameter comprises fluid conductivity of the sand-pack or gravel-pack.

In some embodiments, wherein the physical parameter comprises fluid conductivity of combined perforations and a sand-pack or gravel-pack system.

In some embodiments, physical parameter comprises the radius of the sand-pack or gravel-pack.

In some embodiments, the physical parameter comprises height of the sand-pack or gravel-pack.

In some embodiments, the physical parameter comprises spatial variation of fluid conductivity of the sand-pack or gravel-pack conductivity.

In some embodiments, the physical parameter is determined from at least one of reflection time, reflection phase and reflection amplitude of tube waves in the wellbore.

In some embodiments, the parameter is determined from at least one of frequency, quality factor and amplitude of a resonance in tube waves in the wellbore.

In some embodiments, the physical parameter is determined using a single measurement dataset of pressure or time derivative of pressure.

In some embodiments, the physical parameter corresponds to a property of the subsurface formation at a certain distance from the wellbore.

In some embodiments, the physical parameter is determined by determining differences between waveforms of the tube waves from measurements made before and after a sand pack or gravel pack treatment is applied to the wellbore.

In some embodiments, at least one of the physical parameters is predicted ahead of time by modeling the response of known or expected wellbore and sand or gravel-pack properties.

A method for predicting the characteristics of a sand-pack or gravel-pack in a subsurface formation according to another aspect includes inducing a pressure change in a well drilled through the subsurface formation; determining at least one of a physical parameter, and a time derivative, and a change in the parameter with respect to time, of a sand-pack or gravel-pack, using the measured at least one of pressure and the time derivative of pressure, and correlating the at least one of a physical parameter, and a time derivative, and a change in the parameter with respect to time, of a sand-pack or gravel-pack with at least one of a lithological description of the subsurface formation, and at least one characteristics of the manner in which the sand-pack or gravel-pack was created, and predicting at least one of a physical parameter, and a time derivative, and a change in the parameter with respect to time, of a sand-pack or gravel-pack, to be created in another part of the same, or a similar, subsurface formation.

In some embodiments, the at least one of a lithological description of the subsurface formation, and at least one characteristics of the manner in which the sand-pack or gravel-pack was created comprises the pumping rate with which the treatment was created.

In some embodiments, wherein the at least one of a lithological description of the subsurface formation, and at least one characteristics of the manner in which the sand-pack or gravel-pack was created comprises the sand or gravel grain size with which the sand-pack or gravel-pack was created.

A system according to another aspect for characterizing a sand-pack or gravel-pack in a subsurface formation includes a pressure source in fluid communication with fluid in a wellbore drilled through the subsurface formation, the pressure source operable to induce tube waves in fluid in a wellbore; a sensor in fluid communication with the fluid in the wellbore, the sensor generating a signal related to pressure or pressure time derivative in the fluid in the wellbore; and a processor in signal communication with the pressure source and the sensor, the processor having thereon logic operable to cause the processor to, a. actuate the pressure source to induce a pressure change in in the wellbore so as to induce tube waves in the wellbore, b. interrogate the sensor to obtain measurements of at least one of pressure and a time derivative of pressure in the well for a selected length of time, and c. use as input the measurements of at least one of pressure and a time derivative of pressure, determine at least one of a physical parameter and a change in the physical parameter with respect to time, of the sand-pack or gravel-pack, using the measured at least one of pressure and the time derivative of pressure.

In some embodiments, the physical parameter comprises fluid conductivity of the sand-pack or gravel-pack.

In some embodiments, the physical parameter comprises fluid conductivity of the combined perforations and the sand-pack or gravel-pack system.

In some embodiments, the physical parameter comprises the radius of the sand-pack or gravel-pack.

In some embodiments, physical parameter comprises height of the sand-pack or gravel-pack.

In some embodiments, the physical parameter comprises a spatial variation of fluid conductivity of the sand-pack or gravel-pack.

In some embodiments, the physical parameter is determined from at least one of reflection time, reflection phase and reflection amplitude of tube waves in the wellbore.

In some embodiments, the physical parameter is determined from at least one of frequency, quality factor and amplitude of a resonance in the tube waves in the wellbore.

In some embodiments, the physical parameter is determined using a single measurement stream of pressure or time derivative of pressure.

In some embodiments, the physical parameters corresponds to a physical property of the subsurface formation at a certain distance from the wellbore.

In some embodiments, the physical parameter is determined by determining differences between waveforms of the tube waves in the wellbore measured before and after a sand pack or gravel pack treatment.

A system for characterizing a sand-pack or gravel-pack in a subsurface formation according to another aspect includes a pressure source in fluid communication with fluid in a wellbore drilled through the subsurface formation, the pressure source operable to induce tube waves in fluid in a wellbore; a sensor in fluid communication with the fluid in the wellbore, the sensor generating a signal related to pressure or pressure time derivative in the fluid in the wellbore; and a processor in signal communication with the pressure source and the sensor, the processor having thereon logic operable to cause the processor to, a. operate the source to induce a pressure change in a well drilled through the subsurface formation, b. interrogate the sensor to obtain measurements of at least one of pressure and a time derivative of pressure in the well for a selected length of time, c. use as input the measurements of at least one of pressure and a time derivative of pressure, to determine at least one of a physical parameter, a time derivative of the physical parameter, and a change in the physical parameter with respect to time, of a sand-pack or gravel-pack, using the measured at least one of pressure and the time derivative of pressure, d. correlate the at least one of a physical parameter, time derivative of the physical parameter, and a change in the physical parameter with respect to time, of a sand-pack or gravel-pack with at least one of a lithological description of the subsurface formation, and at least one characteristics of the manner in which the sand-pack or gravel-pack was created, and e. predict at least one of a physical parameter and a change in the parameter with respect to time of a sand-pack or gravel-pack, to be created in another part of the same, or a similar, subsurface formation.

In some embodiments, the physical parameter comprises fluid conductivity of the sand-pack or gravel-pack.

In some embodiments, wherein the physical parameter comprises fluid conductivity of the combined perforations and the sand-pack or gravel-pack system.

In some embodiments, the physical parameter comprises the radius of the sand-pack or gravel-pack.

In some embodiments, the physical parameter comprises height of the sand-pack or gravel-pack.

In some embodiments, the physical parameter comprises a spatial variation of fluid conductivity of the sand-pack or gravel-pack.

In some embodiments, the physical parameter is determined from at least one of reflection time, reflection phase and reflection amplitude of tube waves in the wellbore.

In some embodiments, the physical parameter is determined from at least one of frequency, quality factor and amplitude of a resonance in the tube waves in the wellbore.

In some embodiments, wherein the physical parameter is determined using a single measurement of pressure or time derivative of pressure.

In some embodiments, the physical parameters corresponds to a physical property of the subsurface formation at a certain distance from the wellbore.

In some embodiments, the physical parameter is determined by determining differences between waveforms of the tube waves in the wellbore measured before and after a sand pack or gravel pack treatment.

DETAILED DESCRIPTION

The description below uses specific examples but is not necessarily the only intended or possible implementation or use of methods disclosed herein. A person having skill in the art would readily be able to implement similar methods to obtain the same results. Methods according to this disclosure make practical use of pressure disturbances, pressure waves (tube waves) including their resonances, amplitude changes, reflections, frequency shifts, and other time-frequency properties to determine hydraulic sand-pack or gravel-pack parameters. Also, note that example methods according to the present disclosure are applicable to vertical wells, horizontal wells, or any other deviated well that undergoes sand-pack or gravel-pack completion treatment. Further, note that example methods and system according to the present disclosure are applicable to wells drilled onshore, in transition zones, and in wells drilled in shallow, intermediate and deep water locations.

Concept

Methods according to the present disclosure comprise sending a wavelet/pulse in the form of pressure waves or pressure disturbances from the surface into a wellbore to interrogate the wellbore and subsurface formations penetrated by the wellbore. It is such a pulse or wellbore-related activity that will generate Stonely (tube) waves. Rapidly accelerating or decelerating a small amount of fluid in the wellbore can generate such signals, as can possibly closing or opening valves with pressure differential connected to the wellbore. The former method is preferred as there is a minimal actual disturbance to the measured system, i.e. the wellbore and sand or grave pack. Opening a valve, that will expose the well to an additional, typically not-insignificant volume, will alter the entire fluid-filled behavior and thus affect the measurements presented below. Similarly a large pressure differential generating a strong water hammer at pump shutdown could be used, but its magnitude (often in the range of thousands of psi) results in actual change of the measured properties—e. g., higher flow and fluid pressure will swell spaces between the gravel pack material.

Figure 3:
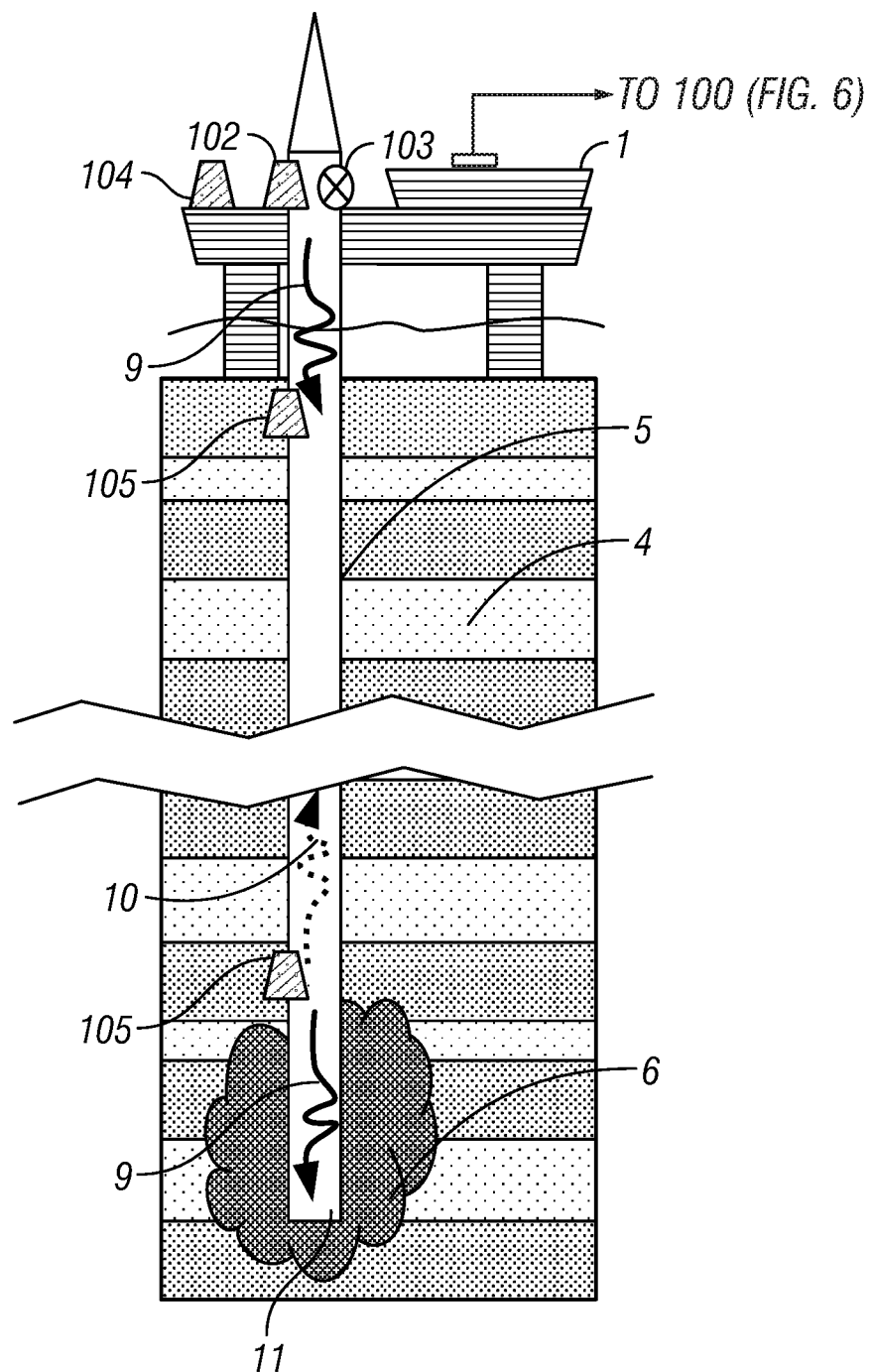
FIG. 3 shows a downward traveling incident pressure pulse 9 (such as a tube wave) incident upon the bottom of the fluid-filled wellbore 11 and sand-pack or gravel-pack 6 to generate an upward traveling reflected pressure pulse 10 which may be detected by a pressure pulse disturbance sensor, such as a hydrophone or a transducer 102. The downward traveling incident pressure pulse may be caused either by a dedicated pressure pulse source 103 located at the surface (e.g., on or in a wellhead), or by incidental activity. Similar pressure disturbance sensors, 105 on the platform or downhole may be optionally positioned on a drilling or production platform 1 or inside the wellbore.

Referring to FIG. 3, when a liquid filled wellbore 5 is excited by a pressure pulse from a source 103 at any point along its length, particularly at a location close to the surface, a wave propagates upwardly shown at 10 and downwardly shown at 9 in the wellbore 5 until it reaches the top or the bottom respectively. If the source is near the very top, for example on the platform, mostly the downgoing wave will be apparent, as the up-going wave will be folded in such a source pulse. Note that the wave may also be reflected from other, known barriers (e.g. tools or other well jewelry) or boundary conditions within the wellbore and a wellbore casing (diameter changes), but since such barriers and/or boundary conditions are known a priori and are often of small effect on the propagation of the wave, the effects of such barriers and/or boundary conditions can be subtracted or modeled-out from measurements made of the wave in respect of its propagation and reflections. One way of adjusting the measured response for such barriers and/or boundary conditions is to make measurements of a propagating wave both before a fracture or gravel pack treatment and after such treatment, superposing the detected signals and subtracting the "after" measurements from the "before" measurements to identify differences (where necessary normalizing for pressure effects). However, other a priori unknown irregularities can be also observed and identified. At a given boundary or barrier, the wave is reflected in a way that is determined by the boundary conditions at such barrier or boundary. For example, if the end/bottom of the wellbore 11 prevents the fluid from exiting or entering the wellbore, the pressure wave will be reflected without a change of polarity, thus a positive pressure pulse will be reflected as a positive pressure pulse. Conversely, if the pressure is released at the end of the wellbore 5 and the fluid can flow freely in or out of the wellbore the pulse will be reflected with a reversal of polarity, thus a positive pulse will be reflected as a negative pulse. Of specific importance are the intermediate boundaries, neither completely "closed", nor completely "open" which will yield reflections intermediate in phase and amplitude between the above-described "open" and "closed" conditions.

In the frequency domain this phenomenon can be viewed as the excitation of free oscillations, otherwise known as resonances. The frequencies of the free oscillation are determined by the wave in the wellbore 5, the wellbore lengths, and the boundary conditions at each end of the wellbore, that is the interaction of the gravel pack 6 with the bottom of the well 11 or the upwardly propagating wave 10 with the top of the well.

Thus, by analyzing the frequencies and rate of attenuation of these free oscillations or resonances one can calculate the nature of the boundary condition at and near the bottom 11 of the fluid filled wellbore 5. For example, if the sand-pack or gravel-pack 6 is essentially impermeable, preventing fluid flow into or out of the wellbore 5, then the bottom of the wellbore 11 will appear "closed" with reference to wave reflection. Conversely, if the sand-pack or gravel-pack 6 is highly permeable, allowing the fluid to flow essentially unimpeded into and out of the wellbore 5, then the bottom of the wellbore 11 will appear "open."

In the case where the wellbore end is neither entirely "closed" nor entirely "open", because the sand-pack or gravel-pack is partially permeable, the disturbance in the sand-pack or gravel-pack obeys a second-order in time differential equation of the form:

$$A(z)(\partial^2 p(t,z))/[\partial t]^2 + B(z)(\partial p(t,z))/\partial t + C(z)(\partial^2 p(t,z))/[\partial x]^2 = S(t)$$

A similar equation describes pressure disturbances within the wellbore. In both cases the second-order in time differential equation is composed of terms that describe wave propagation and terms that describe diffusion behavior. However, the relative amplitude of each of these terms, controlled by the values of $A(z)$, $B(z)$ and $C(z)$, differ in the wellbore and in the sand-pack or gravel-pack.

Figure 2B:
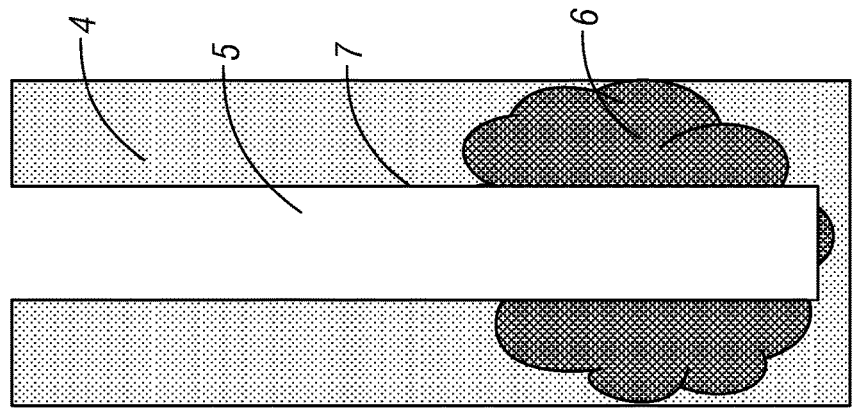
FIG. 2A shows a magnified view of the fluid-filled wellbore 5 passing through a subsurface formation 4 from which it is separated by a wellbore casing 7. The sand-pack or gravel-pack 6 may be located inside the wellbore, as shown in FIG. 2A, or outside the wellbore, as shown in FIG. 2B.
Figure 2A:
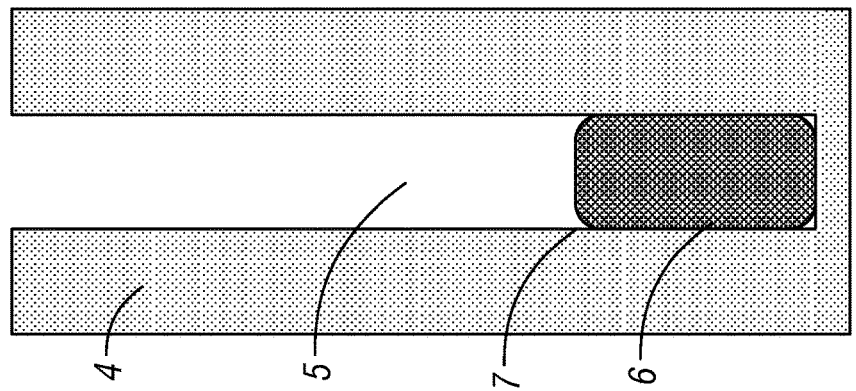
Figure 1:
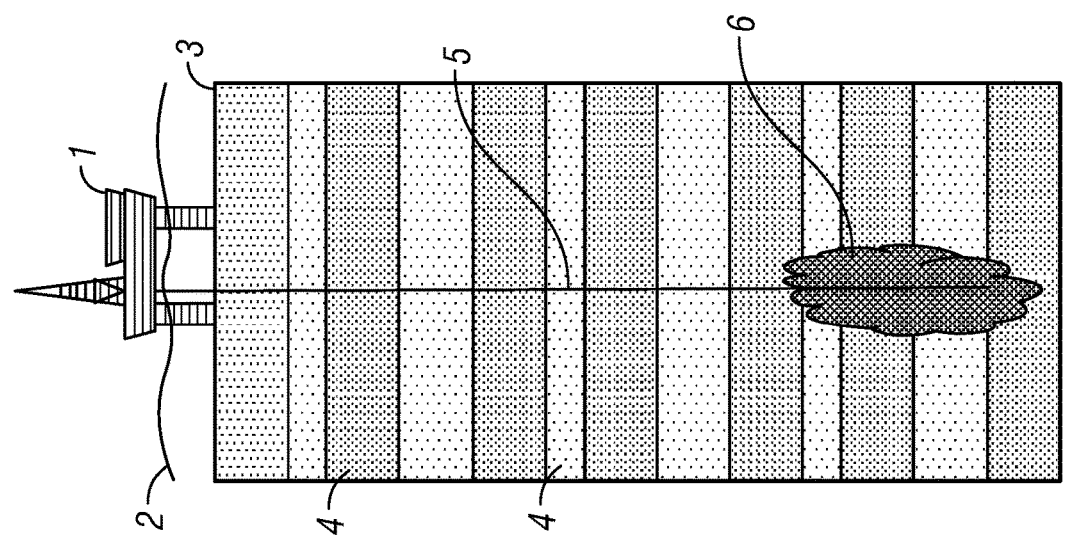
FIG. 1 shows the location of a sand-pack or gravel-pack 6 proximate to the bottom of a wellbore 5 which extends from a drilling or production platform 1 through the sea-surface 2, through the seabed 3 and subsurface formations 4.

In the wellbore 5, the terms in the differential equation depend upon parameters describing the geometry of the wellbore, including its length, the cross-section, variation of cross-section with depth, the speed of sound and viscosity of the fluid filling the wellbore 5, the mechanical properties of the wellbore casing (7 in FIG. 2A) and the elastic and geomechanical properties of the subsurface formation 4 through which the wellbore 5 penetrates.

For the sand-pack and gravel-pack 6, the terms in the differential equation depend upon parameters describing the geometry of the sand-pack or gravel-pack 6, including its vertical and lateral extent, its porosity, permeability and fluid conductivity, and also the viscosity and compressibility of the fluid in the wellbore 5, with some other parameters of the fluid (e.g. temperature) also having secondary or higher order effects.

When these parameters are specified, the differential equation can be used to relate the fluid flow characteristics of the sand-pack or gravel-pack 6 to the expected reflection coefficient of the pressure disturbance (downwardly propagating at 9), upwardly propagating at 10 and oscillating in the wellbore 5. Equivalently, the differential equation can be used to relate the parameters characterizing the sand-pack or gravel-pack 6 to the free oscillation or resonance frequencies, and their attenuation, of the combined wellbore and sand-pack or gravel-pack connected system.

Further this differential equation can be used to relate the reflection coefficient of the pressure disturbance in the wellbore 5 to the fluid flow characteristics of the sand-pack or gravel-pack 6. Further, the differential equation can be used to relate the free oscillation or resonance frequencies, and their attenuation, of the combined wellbore and sand-pack or gravel-pack connected system to the fluid flow characteristics of the sand-pack or gravel-pack.

Various different frequency pressure pulse waves will tend to have different penetration depths based on a fraction of their wavelengths—e.g. 10 Hz wave propagating at ~1000 m/s will have a fractional resolution of ~¼λ, i.e. 25 m. Thus, investigating their reflected behavior allows to interrogate the sand or gravel pack and reservoir to varying degrees of depth.

Acquisition

The acoustic characteristics: tube wave velocity, tube wave attenuation, and the reflection coefficients of the sand-pack and gravel-pack, or equivalently, the frequencies and quality factors of the composite wellbore and sand-pack or gravel-pack system, may be obtained by first exciting a pressure pulse in the wellbore 5 e.g., by using a dedicated source 103, or by using a pressure pulse generated incidentally by other activities. A controlled pulse is preferable, in duration less than it takes for the first reflection to arrive back, to reduce the need to untangle overlapping outgoing and incoming pulse. Such duration is typically several seconds and depends both on the wellbore depth, fluid type, and types of obstacles/reflectors within the wellbore.

These sources may be described as "active" if they are generated substantially for the purpose of making the measurement described herein, or as "passive" if they result from any other activity or event not specifically intended for the purpose of making the measurement described herein (e.g. pumping, wireline activity, perforations, . . . ). Active sources may be, for example and without limitation, rapid piston moving forward and back into the wellbore system and moving a small amount of wellbore fluid in or out with it, operating fluid injection or extraction pumps, piezoelectric sources, magnetostrictive sources and water hammer generated by rapidly opening or closing a valve or otherwise.

The resulting pressure pulse shown as downwardly propagating wave 9 may be recorded before, and/or after the pulse reflects and propagates upwardly at 10 from the sand-pack or gravel-pack 6 proximate to the bottom of the wellbore 11, and/or after multiple reflections, using a receiver such as shown at 104 or 102 proximate to the top of the wellbore 5. Additional receivers (e.g., at 105) may optionally be positioned proximate to the top of the wellbore both in the wellbore fluid, on the wellbore casing or on the ground, and on the rig floor, and at depth in the wellbore to characterize sources of noise which might mask or corrupt the recorded signal. Signals can be recorded and processed in the computing system 100.

Data Processing

Figure 6:
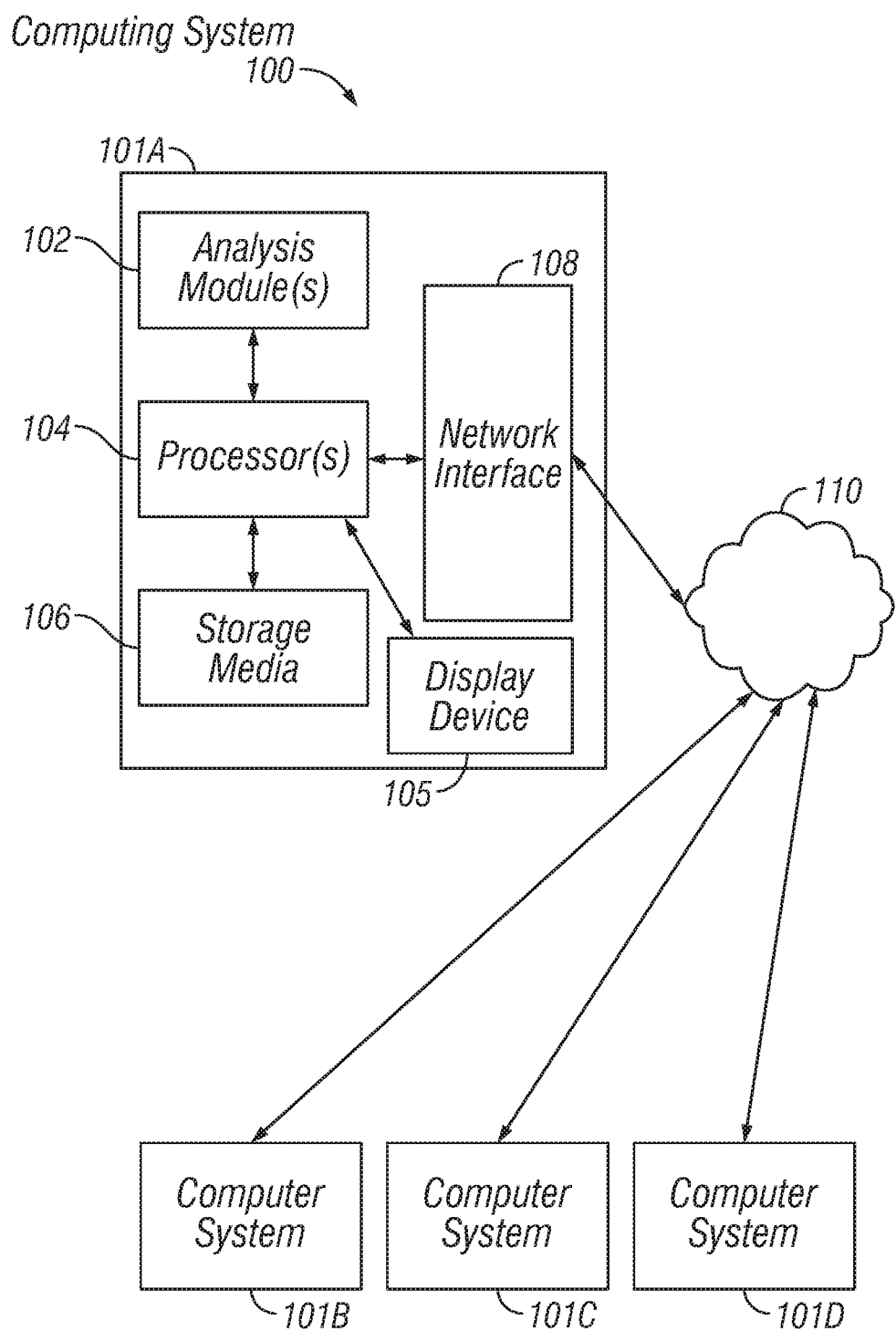
FIG. 6 shows an example embodiment of a computer system that may be used in some embodiments.

Analysis of the recorded data may be performed using the computing system 100 in FIG. 6 in the time domain, in the frequency domain and/or in a mixture of the time and frequency domain. Referring to FIG. 3, for example, the signal reflected (at 10) from the sand-pack or gravel-pack 6 can be compared with the incident signal shown at 9 in the time domain to infer the parameters of the sand-pack or gravel-pack. Alternatively, a time domain recording of the incident, reflected, and multiply reflected signals can be converted to the frequency domain using, e.g., a Fourier transform or other similar method implemented as a fast Fourier transform (FFT), other discrete Fourier transform algorithm, or other time domain to frequency domain conversion algorithm. Alternatively, the analysis can be conducted in a mixed time and frequency domain, for example by dividing up the data into overlapping time windows then performing a Fourier transform as described above. This may be performed, for example, by a Gabor transform (see, Gabor 1945) or otherwise. Repeated measurements can be taken to reduce signal-to noise ratio.

The data can be analyzed by matching the recorded data with simulated data obtained using the second-order in time differential equation described above. This can be done by comparing the recorded data to a set of simulated data calculated for a set of physical parameters describing a variety of conditions and geometries of the sand-pack or gravel-pack and selecting the physical parameters that produce simulated data that best fit the recorded data.

Further, the analysis can be refined by selecting more than one set of values for the parameters describing the wellbore and sand-pack or gravel-pack, including varying properties at different distances from the wellbore, and using these values to interpolate or extrapolate to obtain a more precise fit to the data and a more accurate estimation to the values of the parameters. This method can be used either with a collection of simulated data generated predetermined values for the parameters or by generating simulated data from values of the parameters as needed on-the-fly.

Another method of estimating the values of the parameters characterizing the wellbore and sand-pack or gravel-pack is to use a method known as inversion. In the inversion solution, the model that most closely resembles the observations is chosen, using one of several mathematical processes already known in the literature, providing an estimate of the values of the parameters.

Inversion of the Measurement

Inversion of the measurement to determine physical parameters describing the sand or gravel pack requires a description of how the pressure disturbance interacts with the wellbore and the system comprised by these parts. Within all elements of the system and its component parts pressure disturbances obey a second-order in time differential equation composed of terms that describe wave propagation and terms that describe diffusion behavior. The relative amplitude of each of these terms differ in the wellbore and outside the confines of the wellbore.

In the wellbore, the wave propagation terms dominate and the pressure disturbance propagates as a wave with relatively little attenuation. Except in unusual circumstances inside the sand or gravel packs, the diffusion terms dominate and the amplitude of the pressure disturbance decays rapidly with relatively little wave-like nature. Only in unusual circumstances are interface waves, such as Scholte waves, Rayleigh waves, Love waves and Krauklis waves, excited, and such waves propagate within fractures in the subsurface formations.

A specific method will now be explained to invert the data based on the above understanding. Those skilled in the art will understand that the specific method may be modified or extended in whole or in part. The method, which inverts the data based on the above understanding, will now be explained. The explanation of an example embodiment of the method uses a model, similar to but more complete than others have disclosed (See, e.g., Mathieu and Toksoz, 1984; Hornby et al., 1989; Kostek et al., 1998a; Henry, 2005;), to describe tube wave reflection from fractures. Important elements of this disclosure refer to *complex-valued frequency dependent reflection coefficient, proppant filled Darcy flow, and elastic compliance of the fractures* as described in paragraphs below. Tube waves (Stoneley waves) at the frequencies of interest are idealized as pressure waves obeying the wave equation with speed $c_T$ (see, Biot, 1952). Attenuation during propagation is accounted for using a frequency-independent quality factor $Q_T$, not to be confused with wellhead flow rate Q(t).

The wellbore may be sealed with a packer, and connection with the sand or gravel pack may exist through several perforation clusters in the casing. At low frequencies of interest, wavelengths of tube waves (Stoneley waves) are sufficiently large that it may be assumed that all sand or gravel pack entry points effectively experience the same pressure at their junction with the wellbore. Tube waves thus reflect from the sand or gravel pack (or exposed reservoir, or fractures) collectively, rather than from individual fractures or sand/gravel pack openings. The tube wave reflection coefficient for this geometry may be determined by the expression:

$$R(\omega) = \frac{Z_f(\omega) - Z_T}{Z_f(\omega) + Z_T}, \quad (1)$$

where $Z_T = r_T c_T / A_T$ is the tube wave hydraulic impedance (for a wellbore fluid density $r_T$, tube wave speed $c_T$, and wellbore cross-sectional area $A_T$) and $Z_f(\omega)$ is the hydraulic impedance of the set of features that terminate the portion of the wellbore that is hydraulically connected to the wellhead.

Here, $R(\omega)$ is a complex-valued, frequency-dependent reflection coefficient, and hydraulic impedance Z is defined as the ratio of pressure change to change in volumetric flow rate. The wellhead pressure with respect to time P(t), in response to an imposed wellhead flow rate Q(t), may be expressed in the frequency domain as:

$$\hat{P}(\omega) = Z_T \hat{Q}(\omega) \frac{1 + g(\omega) R(\omega)}{1 - g(\omega) R(\omega)} \quad (2)$$

$$= Z_T \hat{Q}(\omega) \left\{ 1 + 2 \sum_{n=1}^{\infty} [g(\omega) R(\omega)]^n \right\},$$

for reflection coefficient $R(\omega)$ given in Eq. (1) and two-way travel time factor $g(\omega)$ that accounts for attenuation and causality preserving dispersion (See, e.g., Aki and Richards, 2009):

$$g(\omega) = \exp\left( \frac{2i\omega h}{c_T} \left[ 1 - \frac{\ln(\omega/\omega_0)}{\pi Q_T} \right] - \frac{|\omega| h}{c_T Q_T} \right), \quad (3)$$

where h is the wellbore length and $\omega_0$ is a reference angular frequency at which the tube wave phase velocity equals $c_T$. The second form of Eq. (2) highlights the infinite sequence of reflections, which in practice will attenuate. In numerical time-domain implementation examples to follow, one may construct the solution first in the frequency domain and then invert the transform using a fast Fourier transform. In the case of fractures in the formations, an example embodiment of a procedure is described below and a variation thereof can be implemented in the case of a sand pack or gravel pack which can behave similarly to that of a set of fractures.

Single Fracture or Pathway from the Sand or Gravel Pack

Consider a single, one-sided pathway through the gravel pack, a fracture, envisioned as a planar crack extending in the positive x direction away from the wellbore to a distance L. The fracture has cross-sectional area A in the y-z plane (e.g., for an elliptical cross-section, $A = \pi w H / 4$, with maximum width w and height H). The fluid pressure p is assumed to be uniform across this cross-section, but is permitted to vary in the x direction; i.e., p=p(x; t). The fracture is filled with proppant (porosity $\phi$ and permeability k) and fluid (density $\rho$ and dynamic viscosity $\mu$). The volumetric flow rate of fluid along the fracture in the x direction is denoted as q(x; t). The hydraulic impedance of this fracture is defined using pressure and volumetric flow rate at the fracture mouth, $p_0(t) = p(0, t)$ and $q_0(t) = q(0, t)$, respectively, as $Z_0(\omega) = p_0(\omega)/q_0(\omega)$.

An objective is to derive $Z_0(\omega)$ for a single, one-sided fracture. Conservation of fluid mass may be represented as:

$$\frac{\partial(\rho\phi A)}{\partial t} + \frac{\partial(\rho q)}{\partial x} = 0, \qquad (4)$$

assuming negligible leak-off over the short time scales of interest. Next, we rewrite (4) as an equation for pressure perturbation p(x, t) within the fracture. Perturbations are assumed sufficiently small so as to justify linearization (thus the need for a less-invasive source than a pump shut-in water hammer). Following standard procedures in linear poromechanics, it may be assumed that r and f depend on the local pressure p, and define fluid and pore compressibilities as $\beta_f = \rho^{-1}(\partial\rho/\partial p)$ and $\beta_f = \phi^{-1}(\partial\rho/\partial p)$ respectively.

It may also be assumed that a local elasticity relation in which changes in A depend only on the local pressure. This assumption is used in several simple models of hydraulic fractures (e.g., the PKN model, see, Nordgren, 1972). With this assumption, the crack compliance may be defined as $\beta_A = A^{-1}(\partial\rho/\partial p)$. As an example, if it is assumed that the fracture height H is much less than wavelengths characterizing the pressure perturbations in the x direction, then plane strain conditions prevail within the plane of the cross-section. This permits use of the standard solution for a uniformly pressurized mode I crack, for which changes in width $\Delta w$ are related to changes in pressure $\Delta p$ by $\Delta w = (H/G^*)\Delta p$ with $G^* = G/(1-v)$ for solid shear modulus G and Poisson's ratio v. It follows that the crack compliance is $\beta_A = (H/w)(G^*)^{-1}$.

The general definitions of compressibilities and the crack compliance are then used to rewrite the first term in the mass balance Eq. (4) in terms of the pressurization rate $\partial p/\partial t$. In addition, Darcy's law states that:

$$q = -\frac{kA}{\mu}\frac{\partial p}{\partial x}. \qquad (5)$$

With these substitutions, the mass balance in Eq. (4) becomes the diffusion equation for pressure perturbation p(x; t) within the fracture:

$$\rho\phi A\beta\frac{\partial p}{\partial t} = \frac{\partial}{\partial x}\left(\frac{\rho kA}{\mu}\frac{\partial p}{\partial x}\right), \qquad (6)$$

where $\beta = \beta_f + \beta_f + \beta_A$ is the total compressibility/compliance. The diffusivity and diffusion length are, respectively:

$$D = \frac{k}{\mu\phi\beta} \text{ and } L_D = \sqrt{D/\omega}. \qquad (7)$$

Consistent with the assumption of small perturbations, Eq. (6) is linearized and all coefficients (i.e., S, ρ, k, A and μ) are evaluated at reference conditions. In all examples below, one may assume spatially uniform properties.

When the fracture (or the equivalent conductive path through the gravel pack into the formation) is much longer than the diffusion length ($L_D \ll L$), as is typically the case in our experience, the solution to Eq. (6) for imposed volumetric flow rate $q_0(t)$ at the fracture mouth x=0 is, in the frequency domain:

$$\hat{p}(x,\omega) = \hat{q}_0(\omega)\frac{\mu}{kA}\sqrt{\frac{D}{-i\omega}}\exp\left(-\sqrt{\frac{-i\omega}{D}}x\right). \qquad (8)$$

The hydraulic impedance of this single, one-sided fracture is:

$$Z_0(\omega) = \frac{\mu}{kA}\sqrt{\frac{D}{-i\omega}} = \sqrt{\frac{\mu}{-i\omega\phi\beta kA^2}}. \qquad (9)$$

Generalizing the Case to Gravel Pack or Multiple Fractures

Now consider a small section of the wellbore hydraulically connected to a set of N such fractures or entry points through the sand/gravel pack, each extending bilaterally away from the wellbore, and terminated by an impermeable, rigid plug. Elastic interactions between them are neglected. It may be assumed that all entry points experience the same pressure $p_0(t)$ at their junction with the wellbore, and one may define $q_i(t)$ as the volumetric flow rate into fracture i (i=1, ..., N). The hydraulic impedance of the fracture set is:

$$Z_f = (\omega) = \frac{\hat{p}_0(\omega)}{2\sum_{i=1}^{N}\hat{q}_i(\omega)}, \qquad (10)$$

where the denominator in Eq. (10) is the total volumetric flow rate into all N fractures, and the factor of two is because the fractures extend laterally from both sides of the wellbore (x>0 and x<0). If it is further assumed that all fractures are identical, each having hydraulic impedance $Z_0(\omega)$, then $Z_f(\omega) = Z_0(\omega)/2N$.

Compliant, Elliptical Crack Model

As a specific example, suppose that the compressibility or compliance b is dominated by the crack compliance $\beta_A$, such that $\beta \sim (H/w)(G^*)^{-1}$. Using this expression, and assuming elliptical cross-section ($A = \pi wH/4$), the hydraulic impedance of N bilateral fractures, in the small diffusion length limit of Eq. (9), reduces to $$Z_f(\omega) = \frac{2}{\pi N}\sqrt{\frac{G^*\mu\phi}{-i\omega kwH^3}}. \qquad (11)$$

Eq. (11) will be used in the remainder of this disclosure, together with Eq. (1) and Eq. (2), to interpret data.

Active Source Measurement

Figure 4A:
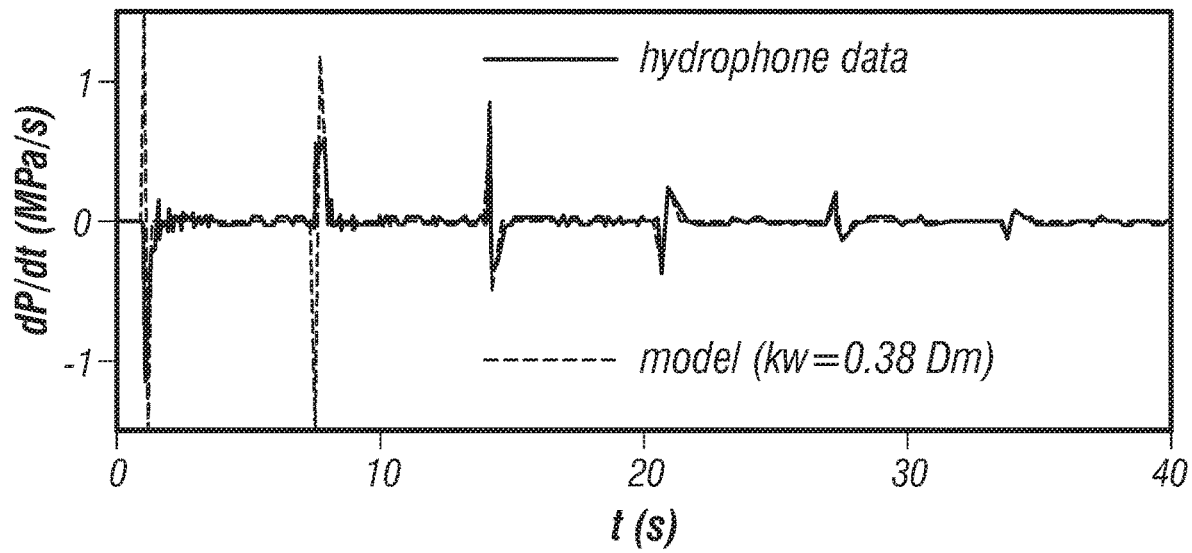
FIG. 4A shows a graph of a representative active source hydrophone or pressure time series.

FIG. 4A shows a representative active source hydrophone (which may be substituted by a sensitive pressure transducer wherein background pressure is represented as an offset and a slope of the signal is taken) time series along with the best-fitting model. The source is idealized as a Gaussian modulation of wellhead flow rate, $Q(t) \sim \exp(-(\omega T)^2/2)$, for source duration T. Setting $c_T = 1460$ m/s, h=4805 m, G=13:3 GPa, N=6, H=10 m, $\phi = 0.5$, and $\mu = 5 \times 10^{-3}$ Pa s, one may then vary the proppant pack (or fracture) conductivity kw, wellbore quality factor $Q_T$, source duration T, and source amplitude to minimize the waveform misfit in the $L_2$ norm. It may be determined that $Q_T \sim 70$, T~0.055 s, and kw~0.38 D m.

Figure 4B:
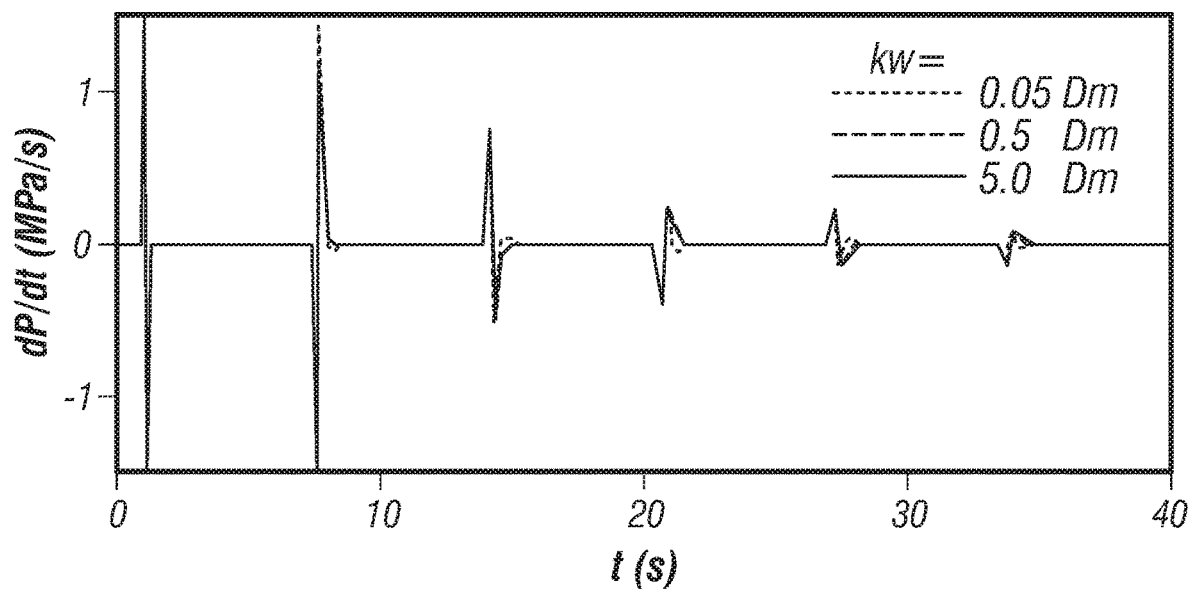
FIG. 4B illustrates how conductivity kw affects waveforms.
Figure 4C:
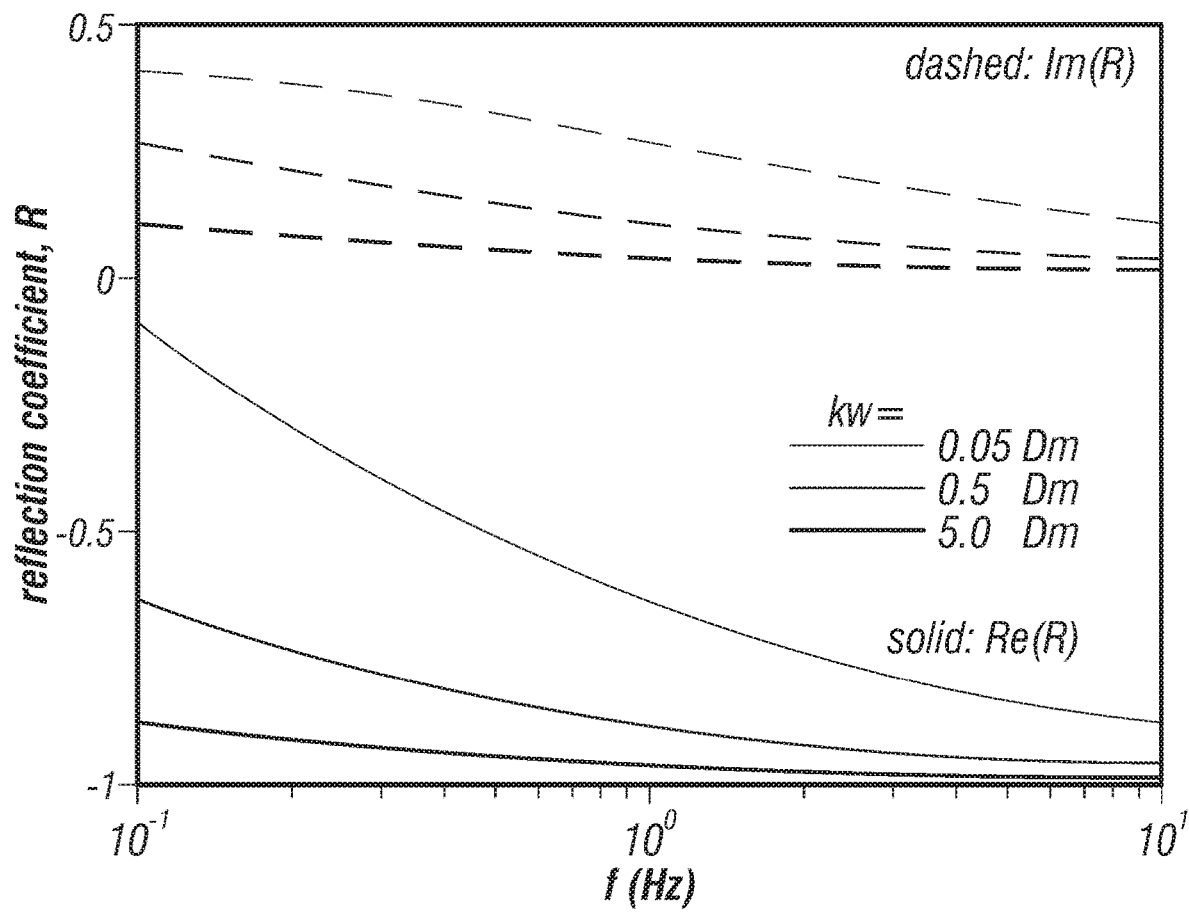
FIG. 4C shows how the reflection coefficient R depends on kw product.

FIG. 4B illustrates how conductivity kw affects waveforms. This is because the reflection coefficient R depends on kw as shown in FIG. 4C. The real part of R is negative, and R→1 at high frequencies and for highly conductive gravel packs (large kw). In this limit, the fracture (gravel pack) hydraulic impedance is much less than the tube wave impedance ($Z_f \ll Z_T$), such that waves reflect as if from a constant pressure (i.e., "open") end. At lower frequencies, and also for less conductive fractures (smaller kw), the gravel pack hydraulic impedance increases, and the reflection coefficient shows appreciable differences from the open-end limit. For even smaller kw than shown in the FIG. 4C, $Z_f \gg Z_T$ and R→1 (i.e., "closed" end).

The inferred value for conductivity, kw~0.38 D m, is reasonably consistent with independent estimates of width w and proppant pack permeability k. First, it should be emphasized that the measurement alone cannot provide separate constraints on k and w. For example, the inferred conductivity is consistent with w=1 mm and k=400 D, w=1 cm and k=40 D, or w=0.1 m and k=4 D. Laboratory measurements of proppant pack permeability (see, e.g., Lee et al., 2010) show values around 100 D, for which the inferred width is 4 mm.

Water Hammer Measurement

Figure 5A:
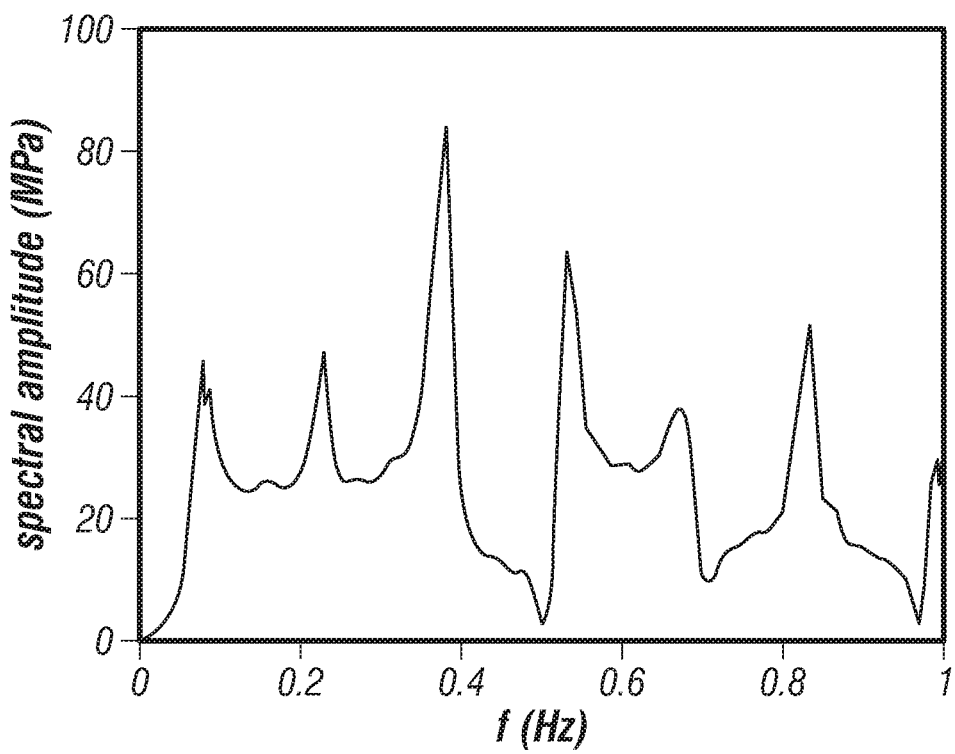
FIG. 5A shows the hydrophone Fourier spectrum from water hammer.
Figure 5B:
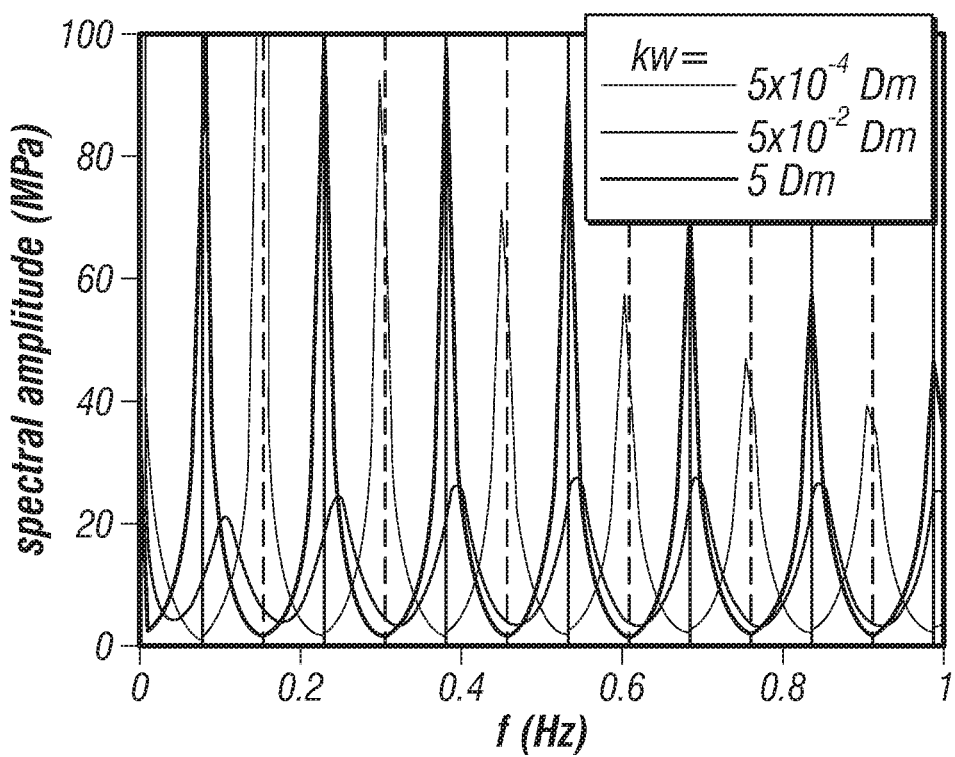
FIG. 5B shows the sensitivity of modeled spectra to fracture conductivity kw.

Next, t data may be interpreted in the frequency domain. FIG. 5A shows the hydrophone Fourier spectrum from water hammer produced when pumps are shut off at the end of the stage (ISIP water hammer). The multiple spectral peaks are the resonant modes of the wellbore-gravel pack system. The resonance frequencies of open- and close-ended tubes are well known. The present example embodiment of a model predicts a continuous transition between these limits as the hydraulic impedance ratio, $Z_f/Z_T$, is varied. FIG. 5B shows the sensitivity of modeled spectra to fracture or gravel pack conductivity kw.

To demonstrate this, one may apply the model with the same parameters as before but with the source flow rate Q(t) idealized as a step function. FIG. 5B shows graphically how kw influences the spectra. The resonance frequencies transition from the closed-end limit for small kw to the open-end limit for large kw. Since the actual source time function is more complicated than a step function, the model may be fit to the data by matching the frequencies and quality factors of individual resonances, rather than attempting to directly match the spectrum. This procedure, not illustrated here, provides values reasonably consistent with those inferred from the active source full waveform inversion.

Interpretation of the Inversion Results

The preceding section described one specific method of inverting the data for a parameter kw/μ which controls the rate at which fluid flows into and out of the sand packed or gravel packed reservoir (and/or fractures) and which may be designated as its conductivity parameter. This is a relevant factor for the subsequent production of hydrocarbons.

In addition, by repeating this measurements at least two distinct times before, during or after the pumping of a sand pack or gravel pack treatment (or even a fracture treatment), it is possible to calculate the change, or rate of change, of the conductivity which provides information and measures on the effectiveness of the pack placement and overall treatment. The initial, "baseline" measurement may also be taken from another dataset of similar parameters of well and formation to estimate such a change. The post-treatment measurement can be taken and inverted some time after the well has been producing to estimate the sand or gravel pack changes over various time frames (minutes, hours, days, weeks, etc.) as necessary or desired.

Moreover, by examining the conductivity calculated from resonances at comparatively low frequencies, intermediate frequencies and high frequencies can be analyzed. Different frequencies are sensitive to different ranges of investigation with low frequencies extending furthest and high frequencies extending the least distances. Thus, from comparison of the conductivity estimates made at different frequencies, it is possible to estimate the conductivity, conductivity changes and rates of conductivity change at different distances from the perforations.

Therefore, the calculation of conductivities and their change with respect to time can be interpreted as originating from the spatial distribution of changes in conductivity, and consequently one can infer the distribution of proppant or gravel pack and its change over time.

Furthermore, the distribution of the sand pack or gravel pack as a function of distance from the perforation can be interpreted in terms of the packing density. A situation where the known total volume of packing material is distributed equally with respect to distance from the well is expected to be the result of a relatively even sand packing. Conversely, when the known total volume of packing material is highly concentrated near the well it is expected that far-field permeability will be large.

Furthermore, it is possible to identify segments of a wellbore that contain features that exhibit significantly larger, or significantly smaller changes in conductivity. These segments can be correlated, or otherwise associated, with particular geological characteristics of the formation in which the wellbore is situated or with various types of sand control treatments. Some of these geological characteristics are typically determined from lithological logs, or other logs (e.g., rate-of-penetration logs) recorded while drilling the wellbore or using data acquired after drilling acquired on, for example, wireline. Once this correlation, or association, of areas yielding high, or low, conductivities with particular features of lithological or other logs has been established for one wellbore, it can then be used to plan perforation and packing (or fracturing) location in other wellbores to optimize operations.

For example, if it is established by correlations or other comparisons that portions of the well that exhibited low rates of penetration while drilling also tend to produce high conductive regions, then in subsequent wells it might be possible to preferentially locate the perforations (where the reservoir fluids would flow through to the wellbore) in segments of the well that exhibited such rates of penetration as desired. Similar behavior in one well would be expected in a proximate well, or a well sharing generally comparable characteristics (depths, region, formation properties, oil content, etc.).

Many correlations between packing types of packing materials and procedures characteristics and lithology (formation mineral composition) or geomechanical characteristics (e.g., bulk and elastic moduli, Poisson's ratio, compressive and tensile strength) of the formation are possible.

Implementation

FIG. 6 shows an example computing system 100 in accordance with some embodiments. The computing system 100 may be an individual computer system 101A or an arrangement of distributed computer systems. The individual computer system 101A may include one or more analysis modules 102 that may be configured to perform various tasks and controls according to some embodiments, such as the tasks explained with reference to FIGS. 2, 3, 4A, 4B, 4C, 5A and 5B. To perform these various tasks, the analysis module 102 may operate independently or in coordination with one or more processors 104, which may be connected to one or more storage media 106. A display device 105 such as a graphic user interface of any known type may be in signal communication with the processor 104 to enable user entry of commands and/or data and to display results of execution of a set of instructions according to the present disclosure.

The processor(s) 104 may also be connected to a network interface 108 to allow the individual computer system 101A to communicate over a data network 110 with sensors, one or more additional individual computer systems and/or computing systems, such as 101B, 101C, and/or 101D (note that computer systems 101B, 101C and/or 101D may or may not share the same architecture as computer system 101A, and may be located in different physical locations, for example, computer systems 101A and 101B may be at a well drilling location, while in communication with one or more computer systems such as 101C and/or 101D that may be located in one or more data centers on shore, aboard ships, and/or located in varying countries on different continents).

A processor may include, without limitation, a microprocessor, microcontroller, processor module or subsystem, programmable integrated circuit, programmable gate array, or another control or computing device.

The storage media 106 that captures data in a tangible medium may be implemented as one or more computer-readable or machine-readable storage media. Note that while in the example embodiment of FIG. 6 the storage media 106 are shown as being disposed within the individual computer system 101A, in some embodiments, the storage media 106 may be distributed within and/or across multiple internal and/or external enclosures of the individual computing system 101A and/or additional computing systems, e.g., 101B, 101C, 101D, or over a network ("cloud"). Storage media 106 may include, without limitation, one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that computer instructions to cause any individual computer system or a computing system to perform the tasks described above may be provided on one computer-readable or machine-readable storage medium, or may be provided on multiple computer-readable or machine-readable storage media distributed in a multiple component computing system having one or more nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that any other embodiment of a computing system may have more or fewer components than shown, may combine additional components not shown in the example embodiment of FIG. 6, and/or the computing system 100 may have a different configuration or arrangement of the components shown in FIG. 6. The various components shown in FIG. 6 may be implemented in hardware, software, or a combination of both hardware and software, including one or more signal processing and/or application specific integrated circuits.

Further, the acts of the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of the present disclosure.

Interpretation and Predictions

Once the values of the parameters describing the geometry of the fluid flow and pressure disturbance behavior of the combined wellbore and sand-pack or gravel-pack system have been determined they may be correlated, or otherwise associated, with the values of the parameters chosen for the creation of the pack. Examples of such parameters include, but are not limited to, the number and distribution of perforations used, the rate or amount of the sand or gravel pumped, the screen parameters, the type or size of sand or gravel, or the method of its pretreatment. Particular methods, or parameter choices, which are more likely to produce sand-pack or gravel-packs with desirable properties can thus be identified and implemented. Similarly, method or parameter choices which are more likely to produce sand-pack or gravel-packs with undesirable properties can also be identified.

Once identified, method and/or parameter choices more likely to produce sand-pack or gravel-packs with desirable qualities can be used to assist in the planning of the production of future sand-pack or gravel-packs.

In addition, a larger dataset across many wells of this type, similar, or parameterized data can be used to predict, improve, and reevaluate models, or prior measurements. Such "learnings" can be effectively implemented using learning and neural network algorithms, in a computing system of likes of the one depicted and describes in FIG. 6.

REFERENCES CITED IN THIS DISCLOSURE

Aki, K., and P. G. Richards, 2009, Quantitative Seismology: University Science Books.

Biot, M., 1952, Propagation of elastic waves in a cylindrical bore containing a fluid: Journal of Applied Physics, 23, 997-1005.

Henry, F., 2005, Characterization of wellbore fractures by the body and interface waves: T U Delft, Delft University of Technology.

Hornby, B., D. Johnson, K. Winkler, and R. Plumb, 1989, Fracture evaluation using reflected stoneley-wave arrivals: Geophysics,54, 1274-1288.

Kostek, S., D. L. Johnson, and C. J. Randall, 1998a, The interaction of tube waves with wellbore fractures, part i: Numerical models: Geophysics,63, 800-808.

Lee, D. S., D. Elsworth, H. Yasuhara, J. D. Weaver, and R. Rickman, 2010, Experiment and modeling to evaluate the effects of proppant-pack diagenesis on fracture treatments: Journal of Petroleum Science and Engineering,74, 67-76.

Mathieu, F., and M. Toksoz, 1984, Application of full waveform acoustic logging data to the estimation of reservoir permeability: Technical report, Massachusetts Institute of Technology. Earth Resources Laboratory. and Nordgren, R., 1972, Propagation of a vertical hydraulic fracture: Society of Petroleum Engineers,12, 306-314

Although only a few examples have been described in detail above, those skilled in the art will readily appreciate that many modifications are possible in the examples. Accordingly, all such modifications are intended to be included within the scope of this disclosure as defined in the following claims.

What is claimed is:

1. A method for characterizing a sand-pack or gravel-pack in a subsurface formation, comprising:
   Inducing a pressure change in a wellbore drilled through the subsurface formation so as to induce tube waves in the wellbore;
   measuring at a location proximate to a wellhead at least one of pressure or a time derivative of pressure in the well for a selected length of time; and
   determining at least one of a physical parameter or a change in the physical parameter with respect to time, of the sand-pack or gravel-pack, using the measured at least one of pressure or the time derivative pressure, the physical parameter comprising at least one of radius of the sand-pack or gravel pack, height of the sand-pack or gravel pack, or spatial variation of fluid conductivity of the sand-pack or gravel-pack.

2. The method of claim 1 wherein the inducing a pressure change comprises pumping a sand-pack or gravel-pack treatment.

3. The method of claim 2 wherein the at least one of a physical parameter, or a change in the physical parameter with respect to time is determined before the pumping the sand-pack or gravel-pack treatment.

4. The method of claim 2 wherein the at least one of a physical parameter, or a change in the physical parameter with respect to time is determined during the pumping of the sand-pack or gravel-pack treatment.

5. The method of claim 2 wherein the at least one of a physical parameter, or a change in the physical parameter with respect to time is determined after the pumping the sand-pack or gravel-pack treatment.

6. The method of claim 1 wherein the inducing a pressure change comprises water hammer generated by changing a flow rate of fluid into or out of the well.

7. The method of claim 1 wherein the inducing a pressure change comprises operating an acoustic source which injects a pressure pulse into fluid within the well.

8. The method of claim 1 wherein the pressure change generates Stoneley waves in the wellbore.

9. The method of claim 1 wherein the physical parameter comprises fluid conductivity of the sand-pack or gravel-pack.

10. The method of claim 1 wherein the physical parameter comprises fluid conductivity of combined perforations and a sand-pack or gravel-pack system.

11. The method of claim 1 wherein the physical parameter is determined from at least one of reflection time, reflection phase or reflection amplitude of tube waves in the wellbore.

12. The method of claim 1 wherein the parameter is determined from at least one of frequency, quality factor or amplitude of a resonance in tube waves in the wellbore.

13. The method of claim 1 wherein the physical parameter is determined using a single measurement dataset of pressure or time derivative of pressure.

14. The method of claim 1 wherein the physical parameter corresponds to a property of the subsurface formation at a certain distance from the wellbore.

15. The method of claim 1 wherein the physical parameter is determined by determining differences between waveforms of the tube waves from measurements made before and after a sand pack or gravel pack treatment is applied to the wellbore.

16. The method of claim 1 wherein the at least one physical parameter Is predicted ahead of time by modeling the response of known or expected wellbore and sand or gravel-pack properties.

17. A method for predicting the characteristics of a sand-pack or gravel-pack in a subsurface formation, comprising:
   inducing a pressure change in a well drilled through the subsurface formation;
   measuring at least one of pressure or a time derivative of pressure in the well;
   determining at least one of a physical parameter, a time derivative of the at least one physical parameter, or a change in the at least one physical parameter with respect to time, of a sand-pack or gravel-pack, using the measured at least one of pressure or the time derivative of pressure, and
   correlating the at least one of a physical parameter, the time derivative thereof, or the change in the physical parameter with respect to time, of a sand-pack or gravel-pack with at least one of a lithological description of the subsurface formation, or at least one characteristics of the manner in which the sand-pack or gravel-pack was created, and
   predicting at least one of a physical parameter, a time derivative, or a change in the parameter with respect to time, of a sand-pack or gravel-pack, to be created in another part of the subsurface formation.

18. The method of claim 17 wherein the at least one of a lithological description of the subsurface formation, or at least one characteristics of the manner in which the sand-pack or gravel-pack was created comprises the pumping rate with which the treatment was created.

19. The method of claim 17 wherein the at least one of a lithological description of the subsurface formation, or at least one characteristics of the manner in which the sand-pack or gravel-pack was created comprises the sand or gravel grain size with which the sand-pack or gravel-pack was created.

20. A system for characterizing a sand-pack or gravel-pack in a subsurface formation, comprising:
   a pressure source in fluid communication with fluid in a wellbore drilled through the subsurface formation, the pressure source operable to induce tube waves in fluid in a wellbore;
   a sensor in fluid communication with the fluid in the wellbore, the sensor generating a signal related to pressure or pressure time derivative in the fluid in the wellbore; and
   a processor in signal communication with the pressure source and the sensor, the processor having thereon logic operable to cause the processor to,
   a. actuate the pressure source to induce a pressure change in in the wellbore so as to induce tube waves in the wellbore,
   b. interrogate the sensor to obtain measurements of at least one of pressure or a time derivative of pressure in the well for a selected length of time, and
   c. use as input the measurements of at least one of pressure or a time derivative of pressure, determine at least one of a physical parameter or a change in the physical parameter with respect to time, of the sand-pack or gravel-pack, using the measured at least one of pressure or the time derivative of pressure, the physical parameter comprising at least one of radius of the sand-pack or gravel pack, height of the sand-pack or gravel pack, or spatial variation of fluid conductivity of the same-pack or gravel-pack.

21. The system of claim 20 wherein the physical parameter comprises fluid conductivity of the sand-pack or gravel-pack.

22. The system of claim 20 wherein the physical parameter comprises fluid conductivity of the combined perforations and the sand-pack or gravel-pack system.

23. The system of claim 20 wherein the physical parameter is determined from at least one of reflection time, reflection phase or reflection amplitude of tube waves in the wellbore.

24. The system of claim 20 wherein the physical parameter is determined from at least one of frequency, quality factor or amplitude of a resonance in the tube waves in the wellbore.

25. The system of claim 20 wherein the physical parameter is determined using a single measurement stream of pressure or time derivative of pressure.

26. The system of claim 20 wherein the physical parameters corresponds to a physical property of the subsurface formation at a certain distance from the wellbore.

27. The system of claim 20 wherein the physical parameter is determined by determining differences between waveforms of the tube waves in the wellbore measured before and after a sand pack or gravel pack treatment.

28. A system for characterizing a sand-pack or gravel-pack in a subsurface formation, comprising:
   a pressure source in fluid communication with fluid in a wellbore drilled through the subsurface formation, the pressure source operable to induce tube waves in fluid in a wellbore;
   a sensor in fluid communication with the fluid in the wellbore, the sensor generating a signal related to pressure or pressure time derivative in the fluid in the wellbore; and
   a processor in signal communication with the pressure source and the sensor, the processor having thereon logic operable to cause the processor to,
   a. operate the source to induce a pressure change in a well drilled through the subsurface formation,
   b. interrogate the sensor to obtain measurements of at least one of pressure or a time derivative of pressure in the well for a selected length of time, and
   c. use as input the measurements of at least one of pressure or a time derivative of pressure, to determine at least one of a physical parameter, a time derivative of the physical parameter, or a change in the physical parameter with respect to time, of a sand-pack or gravel-pack, using the measured at least one of pressure or the time derivative of pressure,
   d. correlate the at least one of a physical parameter, time derivative of the physical parameter, or a change in the physical parameter with respect to time, of a sand-pack or gravel-pack with at least one of a lithological description of the subsurface formation, or at least one characteristics of the manner in which the sand-pack or gravel-pack was created, and
   e. predict at least one of a physical parameter or a change in the parameter with respect to time of a sand-pack or gravel-pack, to be created in another part of the same, or a similar, subsurface formation.

29. The system of claim 28 wherein the physical parameter comprises fluid conductivity of the sand-pack or gravel-pack.

30. The system of claim 28 wherein the physical parameter comprises fluid conductivity of the combined perforations and the sand-pack or gravel-pack system.

31. The system of claim 28 wherein the physical parameter comprises the radius of the sand-pack or gravel-pack.

32. The system of claim 28 wherein the physical parameter comprises height of the sand-pack or gravel-pack.

33. The system of claim 28 wherein the physical parameter comprises a spatial variation of fluid conductivity of the sand-pack or gravel-pack.

34. The system of claim 28 wherein the physical parameter is determined from at least one of reflection time, reflection phase or reflection amplitude of tube waves in the wellbore.

35. The system of claim 28 wherein the physical parameter is determined from at least one of frequency, quality factor or amplitude of a resonance in the tube waves in the wellbore.

36. The system of claim 28 wherein the physical parameter is determined using a single measurement of pressure or time derivative of pressure.

37. The system of claim 28 wherein the physical parameters corresponds to a physical property of the subsurface formation at a certain distance from the wellbore.

38. The system of claim 28 wherein the physical parameter is determined by determining differences between waveforms of the tube waves in the wellbore measured before and after a sand pack or gravel pack treatment.

* * * * *